(12) United States Patent
Qin et al.

(10) Patent No.: US 7,816,920 B2
(45) Date of Patent: Oct. 19, 2010

(54) METAL DETECTOR

(75) Inventors: Qiang Qin, Shenzhen (CN); Tian-You Liu, Shenzhen (CN); Lian-Zhong Gong, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 309 days.

(21) Appl. No.: 12/178,652

(22) Filed: Jul. 24, 2008

(65) Prior Publication Data
US 2009/0251138 A1 Oct. 8, 2009

(30) Foreign Application Priority Data
Apr. 3, 2008 (CN) .................... 2008 1 0300833

(51) Int. Cl.
*G01V 3/08* (2006.01)
(52) U.S. Cl. ...................... 324/326; 324/67; 324/228

(58) Field of Classification Search .................. 326/67, 326/219, 228, 232, 326
See application file for complete search history.

(56) References Cited

U.S. PATENT DOCUMENTS
2008/0237003 A1* 10/2008 Smith et al. ........... 200/61.45 R OTHER PUBLICATIONS
Li et al, Signal Detection Method for Magnetic Resonance, Derwent 2005-571866, Nov. 15, 2004.*

* cited by examiner

Primary Examiner—Bot L LeDynh
(74) Attorney, Agent, or Firm—Zhigang Ma

(57) ABSTRACT

An exemplary metal detector includes a detecting circuit, a SCM, a converting circuit, and a cymometer. The SCM cooperates with the detecting circuit to generate a current signal with a specific frequency, the converting circuit transforms the current signal received from the SCM to a voltage signal, and the cymometer displays a value of a frequency of the current signal according to the voltage signal. When the detecting circuit detects a metal nearby, the value of the frequency of the current signal displayed on the cymometer changes.

14 Claims, 2 Drawing Sheets

METAL DETECTOR

BACKGROUND

1. Field of the Invention

The present invention relates to a detector, and particularly to a metal detector for detecting metal objects.

2. Description of the Related Art

Nowadays, metal detectors are used in various fields and are based on the measurement of changes in the electromagnetic field, which are brought about by metal objects located in a zone to be monitored. Metal detectors are used in the security inspections, such as checking passengers at airports, checking visitors in particularly highly protected buildings or installations. Metal detectors are also used for a wide range of purposes in industry.

Generally speaking, a conventional metal detector includes a transmitting coil, a receiving coil, an oscillator, a cymoscope, a processor, a transducer, and so on. The processor identifies and processes signals generated by the receiving coil, the oscillator, and the cymoscope, and then signals the transducer to output an audible sound according to the processing result. The conventional metal detector is very complicated and expensive, therefore it is not feasible for mass production and adopted widely throughout the various industries. Moreover, analogue signals such as current signals, are easily influenced by the environmental factors while transmitting, thus reducing the accuracy of the detecting results.

What is desired, therefore, is to provide a metal detector with simple structure, low cost, and high accuracy.

DETAILED DESCRIPTION

Figure 1:
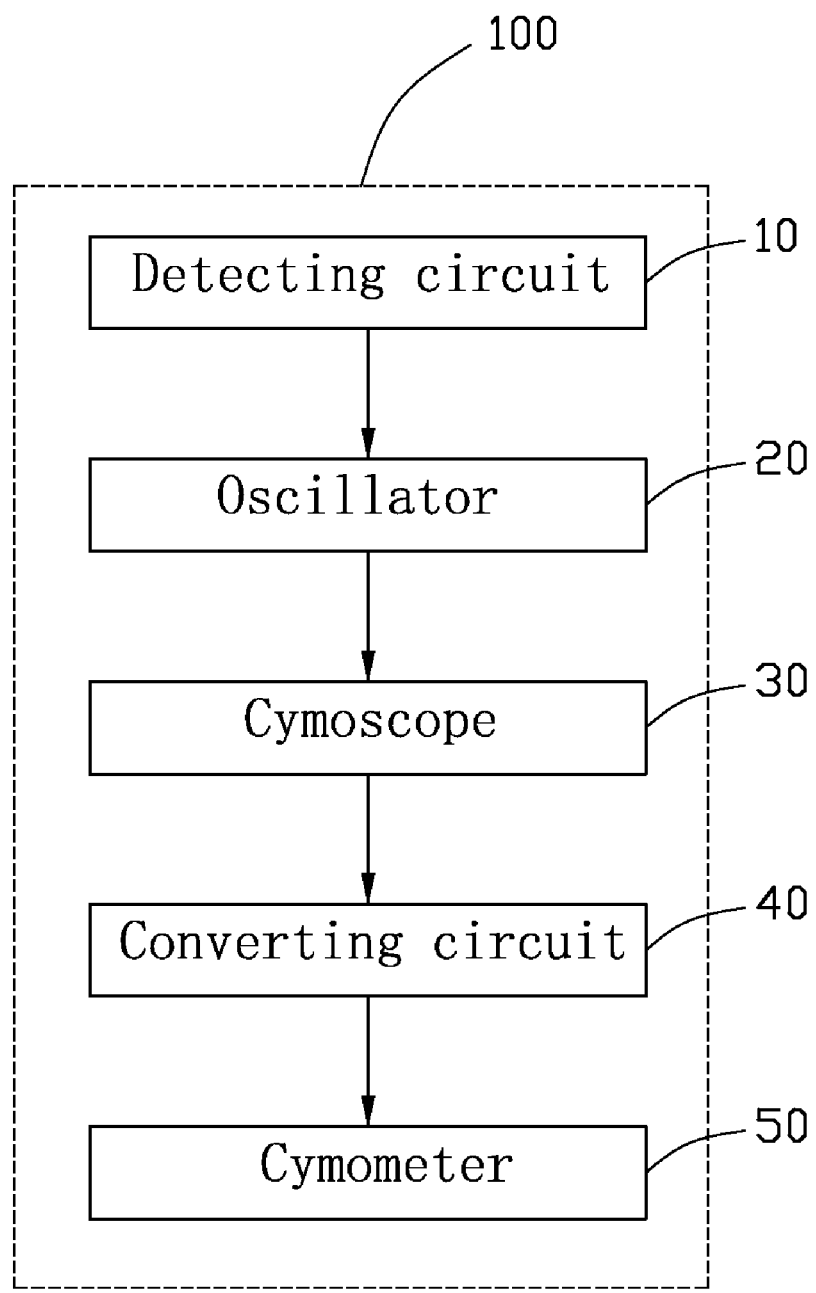
FIG. 1 is a block diagram of hardware structure for a metal detector in accordance with an embodiment of the present invention.

Referring to FIG. 1, a metal detector 100 in accordance with an embodiment of the present invention includes a detecting circuit 10, an oscillator 20, a cymoscope 30, a converting circuit 40, and a cymometer 50. The detecting circuit 10, the oscillator 20, and the cymoscope 30 work together to generate a current signal to the converting circuit 40, the converting circuit 40 transforms the current signal to a voltage signal and transmits the voltage signal to the cymometer 50, and the cymometer 50 displays a value of a frequency of the current signal according to the voltage signal.

Figure 2:
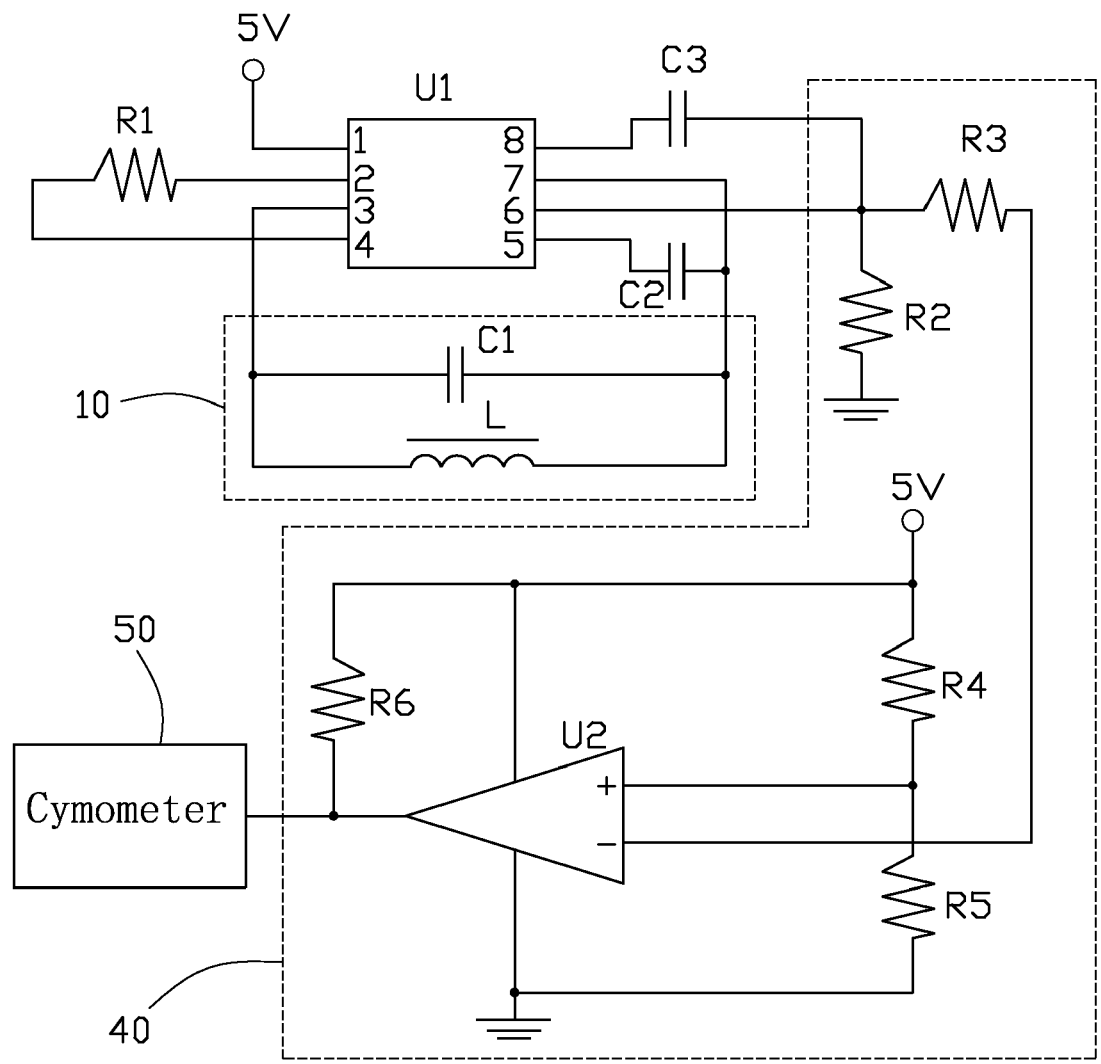
FIG. 2 is a circuit diagram of FIG. 1.

Referring to FIG. 2, the detecting circuit 10 includes an inductance coil L and a capacitor C1. The oscillator 20 and the cymoscope 30 are integrated in a single chip micyoco (SCM) U1, and the SCM U1 includes a power supply terminal 1, two regulating terminals 2, 4, two detecting terminals 3, 7, a filtering terminal 5, an output terminal 6, and a coupling terminal 8. The inductance coil L and a capacitor C1 are connected in parallel between the detecting terminals 3, 7, the power supply terminal 1 is connected to a 5V power supply, the regulating terminal 2 is connected to the regulating terminal 4 via a variable resistor R1, the filtering terminal 5 is connected to the detecting terminal 7 via a capacitor C2, and the output terminal 6 is connected to the coupling terminal 8 via a capacitor C3. A resonant point of the oscillator 20 is changeable by adjusting a resistance of the variable resistor R1.

The converting circuit 40 includes a sampling resistor R2, a coupling resistor R3, two voltage-dividing resistors R4, R5, a pull up resistor R6, and a comparator U2 having a positive input, a negative input, and an output. The sampling resistor R2 and the voltage-dividing resistors R4, R5 are variable resistors. The positive input of the comparator U2 is connected to the 5V power supply via the voltage-dividing resistor R4, and grounded via the voltage-dividing resistor R5. The negative input of the comparator U2 is connected to the output terminal 6 of the SCM U1 via the coupling resistor R3, and the output terminal 6 of the SCM U1 is grounded via the sampling resistor R2. The output of the comparator U2 is connected to the cymometer 50, and also connected to the 5V power supply via the pull up resistor R6. A voltage at the positive input of the comparator U2 is changed by adjusting the resistances of the voltage-dividing resistors R4, R5, and a voltage at the negative input of the comparator U2 is changed by adjusting the resistance of the sampling resistor R2.

When there is no metal near the metal detector, the detecting circuit 10 provides a signal having a resonant frequency to the SCM U1. The SCM U1 sends out a current signal with the resonant frequency. The current signal is sampled by the sampling resistor R2 and transformed to an analog voltage signal. The analog voltage signal is transformed to a digital voltage signal by the comparator U2 and sent to the cymometer 50. The cymometer 50 displays the value of the resonant frequency provided by the detecting circuit 10 according to the digital voltage signal received from the comparator U2.

When the metal detector detects a metal nearby, that is, a magnetic field of the inductance coil L moves across the metal, an eddy current is induced in the metal to create an eddy current magnetic field nearby the metal. The eddy current magnetic field alerts the inductance of the inductance coil L, so as to increase the resonant frequency of the detecting circuit 10, and the value of the frequency displayed on the cymometer 50 changes. Therefore, by reading the value of the frequency displayed on the cymometer 50, it can determine whether there is a metal nearby the metal detector or not.

It is to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A metal detector comprising:
   a detecting circuit;
   a single chip micyoco (SCM) cooperating with the detecting circuit to generate a current signal with a specific frequency;
   a converting circuit capable of transforming the current signal received from the SCM to a voltage signal;
   a cymometer capable of displaying a value of a frequency of the current signal according to the voltage signal;
   wherein upon a condition that the detecting circuit detects a metal nearby, the value of the frequency of the current signal displayed on the cymometer changes.

2. The metal detector as claimed in claim 1, wherein the detecting circuit comprises an inductance coil and a capacitor connected in parallel; the specific frequency is a resonant frequency of the inductance coil and the capacitor; upon a condition that the inductance coil nears the metal, the resonant frequency increases.

3. The metal detector as claimed in claim 1, wherein the SCM comprises a SCM power supply terminal, two SCM detecting terminals, and a SCM output terminal; the SCM power supply terminal is connected to a power supply, the two SCM detecting terminals are connected to each other via the detecting circuit, and the SCM output terminal sends out the current signal.

4. The metal detector as claimed in claim 1, wherein the voltage signal is a digital voltage signal.

5. The metal detector as claimed in claim 4, wherein the converting circuit comprises a sampling resistor and a comparator; the sampling resistor samples the current signal, and transforms the current signal to an analogue voltage signal; and the comparator transforms the analogue voltage signal to the digital voltage signal.

6. The metal detector as claimed in claim 5, wherein the comparator includes a positive input, a negative input, and an output; the positive input is connected to the power supply via a first resistor, and grounded via a second resistor; the negative input is connected to the SCM output terminal, and grounded via the sampling resistor; and the output is connected to the cymometer.

7. The metal detector as claimed in claim 6, wherein the first resistor, the second resistor, and the sampling resistor are variable resistors.

8. A detecting method for a metal detector, the method comprising:

generating a current signal with a specific frequency by a single chip micyoco (SCM) and a detecting circuit;

transforming the current signal to a voltage signal by a converting circuit;

displaying a value of a frequency of the current signal according to the voltage signal on a cymometer;

upon a condition that the detecting circuit detects a metal nearby, the value of the frequency of the current signal displayed on the cymometer changes.

9. The method as claimed in claim 8, wherein the detecting circuit comprises an inductance coil and a capacitor connected in parallel; the specific frequency is a resonant frequency of the inductance coil and the capacitor; upon a condition that the inductance coil nears the metal, the resonant frequency increases.

10. The method as claimed in claim 8, wherein the SCM comprises a SCM power supply terminal, two SCM detecting terminals, and an SCM output terminal; the SCM power supply terminal is connected to a power supply, the two SCM detecting terminals are connected to each other via the detecting circuit, and the SCM output terminal sends out the current signal.

11. The method as claimed in claim 8, wherein the voltage signal is a digital voltage signal.

12. The method as claimed in claim 11, wherein the converting circuit comprises a sampling resistor and a comparator; the sampling resistor samples the current signal, and transforms the current signal to an analogue voltage signal; and the comparator transforms the analogue voltage signal to the digital voltage signal.

13. The method as claimed in claim 12, wherein the comparator includes a positive input, a negative input, and an output; the positive input is connected to the power supply via a first resistor, and grounded via a second resistor; the negative input is connected to the SCM output terminal, and grounded via the sampling resistor; and the output is connected to the cymometer.

14. The method as claimed in claim 13, wherein the first resistor, the second resistor, and the sampling resistor are variable resistors.

* * * * *